D. P. FOSTER.

Wrenches.

No. 5,914. Reissued June 16, 1874.

WITNESSES

Frank G. Parker

Charles Swanda

INVENTOR

Dan P. Foster per William Edson Co

AM. PHOTO-LITHOGRAPHIC Co. N. Y. (OSBORNE'S PROCESS.)

UNITED STATES PATENT OFFICE.

DAN P. FOSTER, OF WALTHAM, MASSACHUSETTS, ASSIGNOR OF ONE-HALF INTEREST TO THOMAS J. ALEXANDER, OF SAME PLACE.

IMPROVEMENT IN WRENCHES.

Specification forming part of Letters Patent No. 22,947, dated February 15, 1859; extended seven years; reissue No. 5,914, dated June 16, 1874; application filed April 22, 1873

*To all whom it may concern:*

Be it known that I, DAN P. FOSTER, of Waltham, in the county of Middlesex and State of Massachusetts, have invented certain new and useful Improvements in Screw-Wrenches, of which the following is a specification:

The object of my invention is a screw-wrench intended for holding equally well flat, square, and round articles, and capable of being released from its grasp upon an article by the motion of the handle in one direction, and of regrasping the article firmly when the handle is moved in the opposite direction; and the novelty in said wrench consists in the combination of the stationary and movable jaws, and also the combination of the same jaws with an actuating-spring, all as more particularly hereinafter set forth.

Figure 1:
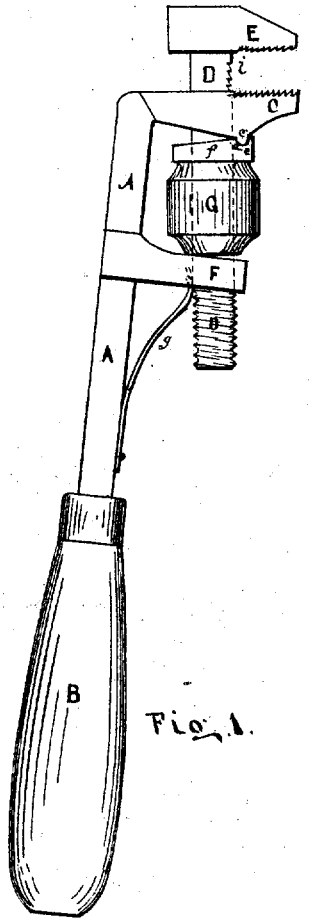
Figure 2:
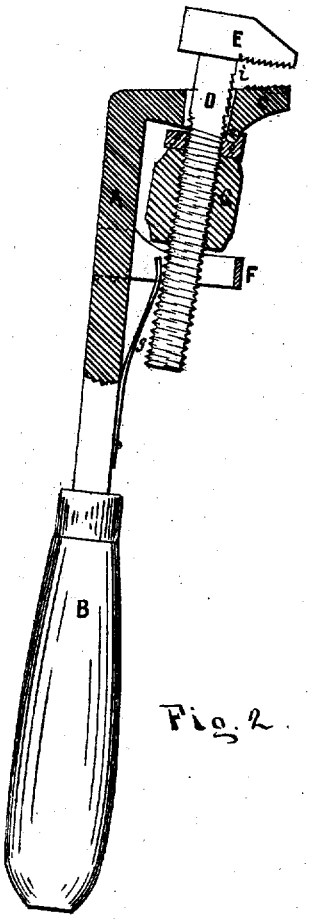

Figure 1 represents the wrench when its jaws are parallel; and Fig. 2 represents the same when the points of the jaws are nearer together than their heels, as they will be when holding round forms.

Let A represent the shank of the wrench, to which the handle B is affixed. The extreme end of this shank-piece is turned at nearly right angles to the shank, to form the stationary jaw C, and through this jaw C there is an opening large enough to admit the shank D of the movable jaw E, and allow the shank free play therein. F is a loop or guide connected to the shank A, and the rear end of the shank D passes through it, and has space to move in as its jaw is strained tight down against the stationary jaw. There is a hinged joint at *a*, upon which the movable jaw and its shank work as follows: On the stationary jaw C there is a rounded projection, *c*, against which a rounded depression, *e*, on the washer *f*, snugly fits, and the thumb-nut G holds the washer *f* tight up against the projection *c*, while the rear of the thumb-nut bears against the loop or guide F. *g* is a spring for forcing out the shank D, and thus keeping its jaws parallel with the stationary one, as shown in Fig. 1. The thumb-nut G runs on a screw-thread cut on two sides of the shank D in the common well-known way, and moves the jaw E from or toward the jaw C. The opposing faces of the jaws may be roughened in any of the usual ways, to cause them to take a firmer hold, or they may be smooth when designed to be used on nuts.

Where the wrench is intended for use on round articles—as, for instance, upon gas-pipes—I prefer to have teeth upon the jaws, constructed and arranged as shown in the drawings, so that those upon each jaw will bite against the article grasped by them when the handle is turned in one direction, and release said article when the handle is turned in the opposite direction.

This wrench will hold round as well as square or flat iron, the whole power applied to it tending to make the jaws the more tightly hold whatever may be between them. The part *i* of the shank D may also be roughened, as seen in the drawings.

When the wrench is to be used its jaws are placed over or around the article to be held or turned in the position shown in Fig. 1. Power being applied to the wrench, the tendency of the movable jaw E is to approach at its point the stationary jaw C, as shown in Fig. 2, and this causes the jaw to more tightly hold whatever may be between them. The open hinged joint at *a* admits of the movable jaws rocking at said joint, and yet it in nowise interferes with the action of the thumb-nut G or washer *f*.

I thus make a very cheap and efficient wrench that will firmly hold between its jaws round as well as square and flat bars, pieces, or articles, such as pipes, tubes, rods, nuts, &c.

I claim as my invention—

1. In a screw-wrench, the combination of a movable jaw whose shank passes through the stationary jaw where the two jaws are pivoted together, and which has a lateral play therein, so that when an article is between said jaws a movement of the handle in one direction causes said jaws to grasp said article firmly, and a movement of the handle in the opposite direction causes the jaws to release their grasp, substantially as set forth.

2. In a screw-wrench, the combination of a stationary jaw, a movable jaw whose shank passes through the stationary jaw, and a spring to actuate the movable jaw, all constructed and arranged substantially as set forth.

DAN P. FOSTER.

Witnesses:
WILLIAM EDSON,
FRANK G. PARKER.